I. F. BURTON, W. W. MOYER & L. Y. SQUIBB.
FLEXIBLE SHAFT COUPLING.
APPLICATION FILED APR. 28, 1916.
1,286,527.
Patented Dec. 3, 1918.
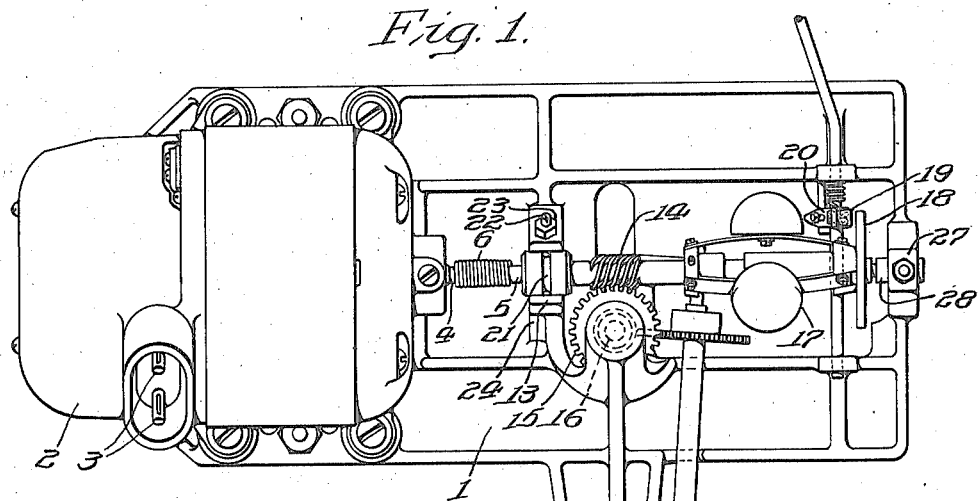
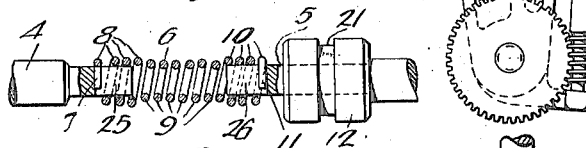
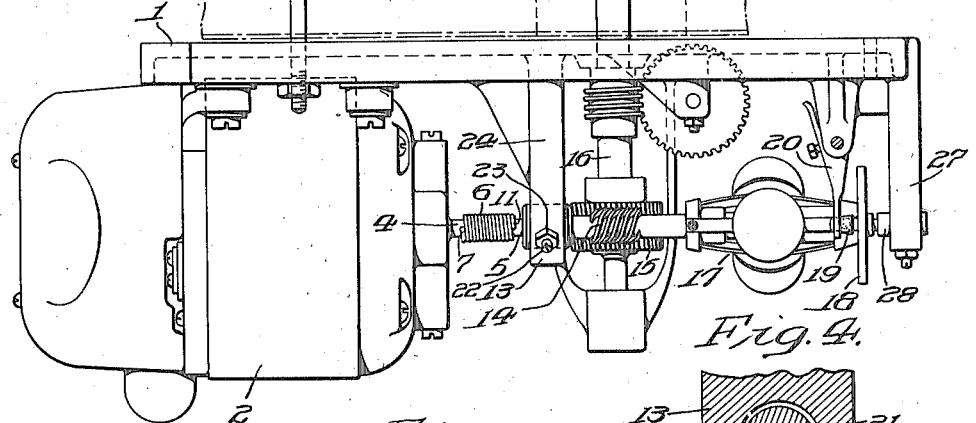
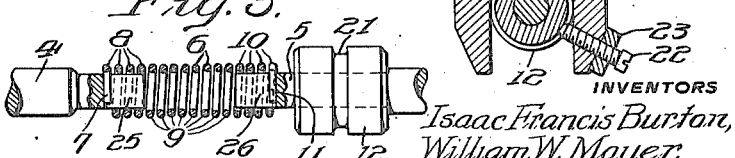
INVENTORS
Isaac Francis Burton,
William W. Moyer,
Lloyd Y. Squibb.
WITNESS
BY
ATTORNEYS

UNITED STATES PATENT OFFICE

ISAAC F. BURTON, OF PHILADELPHIA, PENNSYLVANIA, AND WILLIAM W. MOYER AND LLOYD Y. SQUIBB, OF CAMDEN, NEW JERSEY, ASSIGNORS TO VICTOR TALKING MACHINE COMPANY, A CORPORATION OF NEW JERSEY.

FLEXIBLE SHAFT-COUPLING.

1,286,527.          Specification of Letters Patent.          Patented Dec. 3, 1918.

Application filed April 26, 1916. Serial No. 94,119.

*To all whom it may concern:*

Be it known that we, ISAAC F. BURTON, a citizen of the United States, and a resident of the city of Philadelphia, county of Philadelphia, and State of Pennsylvania, WILLIAM W. MOYER, a citizen of the United States, and a resident of the city of Camden, county of Camden, and State of New Jersey, and LLOYD Y. SQUIBB, a citizen of the United States, and a resident of the city of Camden, county of Camden, and State of New Jersey, have invented certain new and useful Improvements in Flexible Shaft-Couplings, of which the following is a specification.

Our invention relates to means and apparatus in talking machines for operatively joining a source of power with the driven members where action is controlled by a delicately adjusted governor. An additional characteristic of the driven members is that they are required to rotate constantly with entire avoidance of alteration of speed. In the use of an electric motor as a source of power for driving a talking machine turntable it is very frequently the case that the source of electrical energy is variable in strength of current and therefore the motor varies in speed over a considerable range of variation of revolutions unless controlled by the governor. These variations take place and cease very suddenly and as a consequence of this create a condition where the governor while regulating the speed under ordinary circumstances is hampered in its action by fact of the abruptness of increase and decrease of speed of the driving motor.

An advantage of the spring joining or connecting means which we wish to completely describe is that it is proportioned as to gage of wire used and the coiling thereof and as well the distance between coils so that when a sudden increase of revolution is thrust upon the apparatus, the spring itself becomes additionally tensioned and then absorbs the additional revolutions by reason of the fact that while the driving end of the spring has additional force applied to it the driven end by the regulation of the governor is held by the governor and tends therefore to continue at the former speed. Thus the additional revolutions and shock thereof are taken up by the spring.

Another advantage resulting from the use of our improvement is that it very readily adapts itself to frequent and instant separation of the driving from the driven members. It is not often that the driven members must be taken from place, but in the use of an electric motor it is sometimes necessary to remove the driving member (the motor) from place for examination, repair and adjustment of brushes thereof. As between the driven and driving members there are no screws to remove and replace with chance of loss and as the connection is almost instantly removable with great ease, there is as a whole a manifest advantage resident in the construction discovered by us.

Additionally an advantage is that our spring connection positively joins, with absence of slipping, the driving and driven members.

An important advantage is that we have overcome the necessity of having the driving and driven members in exact alinement for it is immaterial in our improved construction that any small sidewise or vertical displacement of either the driving or driven members exists. That is within the limits of the construction either moving part may be displaced, at the same time the capacity of the spring connection to adapt itself to such displacement completely overcomes the effects of such displacement for it will continue to transmit the driving force with either end displaced from the axis of the other end, and all functions of the connection will be performed without any lessening of effectiveness.

In the drawings accompanying this specification and relating thereto Figure 1 shows a view from below of a base plate with an electric motor positioned thereon with the driven mechanism comprising the regulating means also mounted on the bed plate thus forming a self contained talking machine motor mechanism. Fig. 2 shows a side view of the motor mechanism in elevation and attached to a motor board or other part of the containing cabinet. Fig. 3 shows the spring connection in detail, connected to its adjoining parts which are broken away to confine the view to the immediate vicinity of the connection. The spring connection itself is sectioned for the most part and as well a part of the connected members. Fig. 4 shows the bearing of the driven member, the seating therefor, and the driven shaft and the means for holding the removable parts in place, for the most part in section. Fig. 5 shows a slightly modified form of the spring connection wherein the internal diameter is less than the external diameter of the connected shafts.

The bed plate 1 is commonly attached to the under side of a so-called motor board which forms a part of the cabinet container in which are placed the various parts comprising a talking machine not shown in the drawing. At one side of the bed plate is attached the electric motor 2 suitable for the purpose in hand with terminals 3, 3 to which are joined the wires supplying the electric current. A short shaft 4 termed the driving shaft extends from the motor practically in alinement with the driven shaft 5.

Extending between shafts 4 and 5 and connecting them is positioned the coiled spring 6 the internal diameter of the coils whereof being substantially the same diameter as the exterior diameter of the shafts 4 and 5. The driven shaft 5 extends through the bracket 24 in its bearing 12 and extends to a thrust bearing 28 in the bracket 27. The shaft 5 has upon it the worm 14 meshing with the worm wheel 15 upon the shaft or spindle 16 upon which at the upper end not shown is mounted a turntable.

For the purpose of regulating the speed of the shaft 5 and spindle 16 a governor 17 with governor disk 18 is mounted thereon. The action of the governor is perfectly well known, and the disk 18 thereof at proper speed of rotation moves over to contact the pad 19 as positioned by the arm 20.

Referring to Fig. 3 the spring 6 is shown having the ends 7 and 11 inserted in elongated slots 25 and 26 in the ends of shafts 4 and 5. The slots 25 and 26 are made of practically the same dimension and extend from the end of the shafts inwardly as indicated and are cut through from side to side of the shaft. As the ends of the spring 7, 11 are seated at the innermost portion of the slot several coils of the spring surround the ends of each shaft, in the drawings about 3 coils, 8 and 10 are in contact with each shaft. Between the ends of the shafts the spring coils are separated longitudinally so that no contact shall be made between the coils and by this arrangement the spring in its action is more flexible than it would be if the coils were in close contact.

Although the coils 8 and 10 of the spring 6 are held from slipping upon the respective shafts by reason of the ends 7 and 11, on account of the direction of coiling of the spring 6 as placed on the shafts there is a very definite action of the springs to contract and grip the shafts 4 and 5, and the action of the ends 7 and 10 is not primarily that of driving connections between the parts, they serve to start the gripping action in case anything tends to prevent it. Once the gripping action is started it is maintained positively as long as the rotation continues.

The gripping of the shaft ends by the spring is occasioned by the fact that the spring is attached at each end so that when force is applied a tendency to coil the spring is present at each end, that is the action of the driving shaft tends to draw the end of the spring, fastened by the end 7 thereto, into a coiled position, or in other words tends to wind up the spring 6. That is, the ends 7 and 11 when they are obliged to act serve to coil one or more coils and the tightened coils then serve to grip the shaft and coil the remaining portions of the connection in contact with the shafts. At the other end the driven shaft 5 drags behind the spring 6 and thus tends to coil or wind up the coils 10 of the spring 6 in contact with shaft 5. Thus the springs are firmly connected to the shafts without slipping and with a minimum chance for breakage of parts.

In order to increase the gripping action of the coils 8 and 10 the spring may be made with an internal diameter slightly smaller than the diameter of the shafts as shown in Fig. 5. In this case the ends 7 and 11 are inserted in the respective slots 25 and 26 and the springs as then held at the ends are slightly uncoiled. The action of uncoiling enlarges the internal diameter of the spring and as thus enlarged the spring is passed into the shaft at each end similarly so that the ends 7 and 11 are seated at the innermost ends of the slots 25 and 26. When in this position the uncoiling action is relaxed and the spring immediately grasps and firmly contacts with the shafts.

In case it is wished to remove the motor or for another reason to disconnect the shafts the spring may be readily and without tools almost instantly disconnected by grasping the spring in the position denoted by the coil 9, slight force applied to enlarge the coils on the shaft and then easily drawn off the shaft at one end or the other. By the above described action the spring is readily re-positioned for performance of its functions.

Having thus described our invention, we claim and desire to protect by Letters Patent of the United States:

1. In a flexible shaft coupling between a winding member and a wound member in a talking machine, the combination with the motor driving shaft and a driven shaft, each having a peripheral slot near the end thereof, a coiled spring with end portions bent at an angle, said end portions being positioned in said slots respectively, the end coils of the spring overlapping and encircling the ends of each shaft.

2. A flexible shaft coupling between a winding member and a wound member in a talking machine, an electric motor, a stub shaft driven thereby, a turntable, a driven shaft actuating the turntable, each of said shafts having a portion thereof removed at its free end and its vicinity, a flexible actuating and connecting member comprising a coiled spring extending between said shafts and having its ends inserted in the space of the removed portions, said flexible member extending around the shafts and operating to increase the strength of operative union between said shafts and said connection during the transmission of power by the shafts.

3. In a sound reproducing motor mechanism a bed plate to which certain parts are connected, forming a self-contained motor mechanism, an electric motor, a driving shaft extending therefrom, a driven shaft cooperating therewith and actuating a turntable for sound reproduction apparatus, a governor connected to regulate said driving shaft, each of said shafts being longitudinally slotted from its free end inwardly and opening into a peripheral slot, and connecting actuating means constituting a multiple connection between said shafts, said means consisting of a coiled spring having deflected ends adapted to engage said slots in each shaft, the deflected ends upon said spring member entered in said slots, certain of the coils of the spring contacting positively with the respective shafts, and the intermediate coils being distended and normally noncontacting with each other during the transmission of power by said shafts.

4. A flexible actuating coupling between a driven shaft and the driving shaft of a motor for transmitting power, comprising in combination the said shafts cooperating with each other and a coiled spring member whose ends extend over and are detachably secured to the end portion of the driving and driven members, the outside dimension of the coiled spring member at its overlapping ends being greater than the diametric dimension of that portion thereof between the driving and driven members.

5. A flexible actuating coupling between a driven shaft and the driving shaft of a motor for transmitting power, comprising in combination the said shafts cooperating with each other, each of said shafts having a recess formed in the end portions thereof, a coiled spring constituting a flexible actuating coupling between and with its end coils extending over said driving and driven members and positioned in said recesses in the shafts, said coiled spring having an outside peripheral dimension at the portion overlapping the driving and driven members larger than the outside dimensions thereof between said members.

6. A flexible coupling between a driven shaft and the driving shaft of a motor for transmitting power comprising in combination the said shafts recessed near their cooperating ends with each other, a spring member having end portions to be entered in said recesses and extended about both shafts in the vicinity of said recessed portions and extending therebetween.

In witness whereof we have hereunto set our hands this 27th day of April, A. D. 1916.

ISAAC F. BURTON.
WILLIAM W. MOYER.
LLOYD Y. SQUIBB.